Jan. 30, 1934.  E. RIEMENSCHNEIDER  1,945,076
METHOD OF MAKING WELDED AXLE HOUSINGS
Filed Sept. 11, 1930
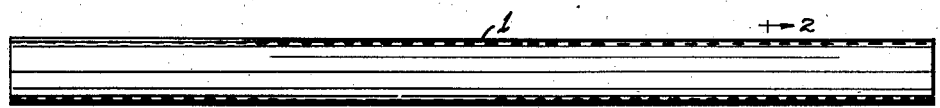
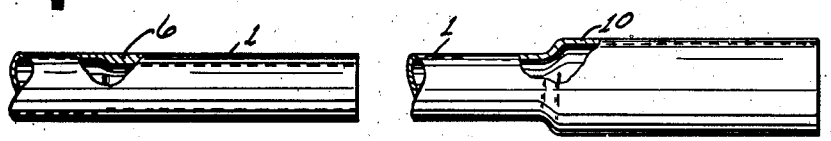
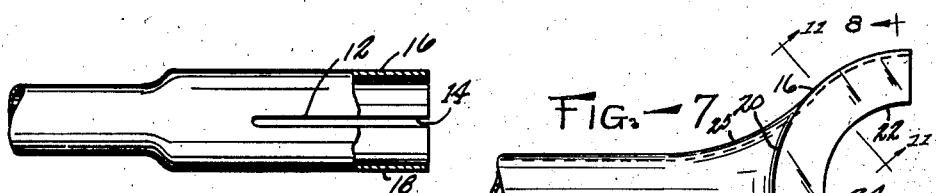
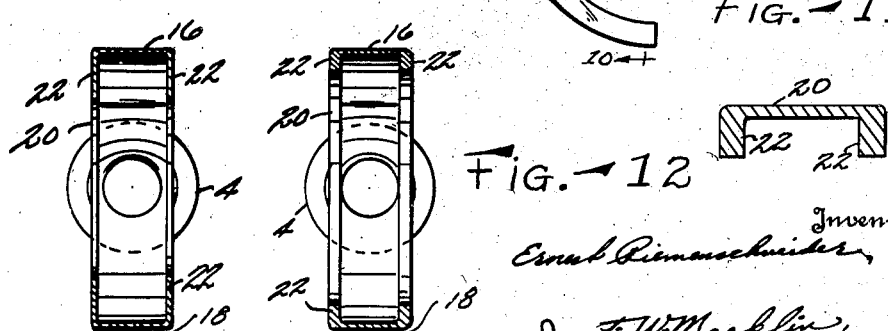

Patented Jan. 30, 1934

1,945,076

UNITED STATES PATENT OFFICE 1,945,076

METHOD OF MAKING WELDED AXLE HOUSINGS

Ernest Riemenschneider, Cleveland, Ohio, assignor to The Midland Steel Products Company, Cleveland, Ohio, a corporation of Ohio Application September 11, 1930
Serial No. 481,177

12 Claims. (Cl. 29—153.1)

This invention relates to a method of forming rear axle housings for motor vehicles and is particularly concerned with housings formed from circular tubing.

Heretofore in the manufacture of such housings, several methods have been used, all of which are comparatively expensive either because of type of stock, material wasted or labor required for assemblage.

In one method, a tubing of comparatively large diameter is swaged down on each side of the center to form the axle housing portions, a portion at the center being retained at the original diameter. This large central portion is then slit longitudinally, spread open and formed into the gear housing portion. This method requires the use of expensive special equipment dies and the employment of skilled operators.

The other methods contemplate stamping blanks and shaping them into upper and lower halves of housings, and then welding the halves together along two longitudinal seams extending the full length of the housing. The exceedingly long weld required is expensive and, due to the irregular outline of the blank, a considerable percentage of the stock is wasted.

The next method reduced this waste by the use of quarter housing blanks, but this method required an additional weld across the gear housing portions.

In these methods quite often the apron flanges are separately formed and welded onto the finished housing or cast sleeves with apron ends are fitted thereon. When such separate parts are used, careful fitting of these parts of the housing is required to obtain the correct overall dimensions.

My method makes possible the manufacture of axle housings of better quality and of smoother contour than those produced by use of the present methods, and, at the same time effects a large savings in cost.

For instance, my method eliminates all waste of stock and, since the apron flanges are formed integral with the housing, greatly reduces the labor required.

Another advantage of my method is that it may be effectively practiced with standard mill equipment and dies, all of which may be put to numerous other uses when my method is not being practiced.

Another advantage of my method resides in the fact that by its practice housings of uniform high quality may be produced in a minimum of time.

Still another object of my process is that the various steps are comparatively simple and easy to apply so that expert or highly skilled labor need not be employed for applying it effectively.

The manner in which I accomplish these and other objects and advantages of my method will become apparent from the following specification in which reference is made to the drawing by the use of numerals, like numerals being used to designate the same parts in the various views.

In the drawing—

Fig. 1 is an elevation of a piece of stock tubing of the required length to form into a portion of housing by my process;

Fig. 2 is a cross sectional view of the tube illustrated in Fig. 1 taken on a plane indicated by the line 2—2 of Fig. 1;

Fig. 3 is an elevation of the tube illustrating the forming of the brake apron flange on one end, part thereof being shown in section for clearness;

Fig. 4 is an elevation of the other end of the tube illustrated in Fig. 3, part being shown in section to illustrate the first step in forming the enlarged central portion for the gears;

Figs. 5, 6 and 7 are elevations, partly in section, of the same end of the tubing illustrating, in the order listed, the next successive steps of my process;

Fig. 8 is a cross sectional view of the partially formed housing illustrated in Fig. 7 and is taken on a plane indicated by the line 8—8 thereon;

Fig. 9 is a side elevation of one-half of the finished housing;

Fig. 10 is a cross sectional view of the housing illustrated in Fig. 9 and is taken on a plane indicated by the line 10—10 on Fig. 9;

Fig. 11 is a cross sectional view of the central flange of the housing illustrated in Fig. 7 and is taken on a plane indicated by the line 11—11 on Fig. 7;

Fig. 12 is a cross sectional view of the central flange of the finished housing and is taken on a plane indicated by the line 12—12 of Fig. 9.

In carrying out my process, a predetermined length of tubing, preferably circular in cross section, as illustrated in Figs. 1 and 2, is used. The tubing stock is preferably welded tubing formed from strip stock by any of the present methods, as this eliminates waste material such as occurs in practice of the blanking and forming methods.

In carrying out my process, I prefer to use heated stock. An end of the heated tube is placed in a suitable female die and forcefully engaged by a complementary male die to produce a predetermined upset. This upset of the stock furnishes the extra material required for the next operation. The upset end is engaged by suitable dies to spread outwardly or swell a portion thereof to form a frusto-conical portion 2 and an enlarged annular portion 3, the walls of which may be of greater thickness than the original tube to permit machining to a smooth finish, inside and out if desired. The end portion of the enlarged annular portion 3 is likewise engaged by dies which form it into a thickened flange 4 sufficiently heavy for securing the brake apron thereon by rivets, or otherwise.

The other end of the tube is engaged by suitable upsetting dies to upset a portion of the tube, as indicated at 6, to furnish the extra material required for the formation of the gear case portion while obtaining a wall thickness substantially equal to that of the original stock. The tube is next swelled, as indicated at 10. If desired, both of these operations may be performed simultaneously. Any manner of enlarging the end of the tube may be used. The enlarged portion is then slid over a suitable shoe or mandrel and engaged by knives or punches which slot it longitudinally, the slots indicated at 12 and 14 in Fig. 6 being diametrically opposite and dividing the end into two sections 16 and 18.

After the slotting operation, the tube is placed in a female die and engaged by a complementary die. These dies open the slot, spreading the sections 14 and 16 relatively apart, and form them into a large semi-circular housing portion integral with the tube, as indicated at 20, having side flanges 22, as illustrated in Figs. 7 and 11. Likewise, the adjacent portion 21 of the tube is given the desired shape so that the semi-circular portion gradually blends into the original tube.

It should be noted that the flanges 22 of the semi-circular housing portion 20 are comparatively thin and wide, as better illustrated in Fig. 11, and that the semi-circular opening 24 which is defined by the new position and shape of the edges of the slots 12 and 14, is comparatively small. It is desirable that this opening be as large as possible and that the flanges 22 be comparatively heavy in order to furnish sufficient body for bolting the usual closure plates on the housing. Therefore, the tubing illustrated in Fig. 7 is next placed in a suitable upset die, and struck a heavy blow so as to upset the flanges 22. This die may also impart a final shape to the portion 25. This greatly increases the size of the opening 24, as illustrated in Figs. 9 and 10, and makes the flanges 22 comparatively narrow radially and very thick, as illustrated in Figs. 8 and 12 for the purposes above mentioned and to facilitate the welding, as will now be described.

The tube, being thus shaped and operated upon, comprises half of a complete housing and since the flanges 22 are semi-circular, a similarly shaped tube may be placed with the ends of the semi-circular portions 20 abutting the two sections butt welded or otherwise fastened together to form a complete rear axle houisng, having integral apron flanges and enlarged diameters where required. As is apparent, a relatively very small amount of welding is required, in fact, only the small channel shaped ends of the semi-circular portions, the length of which is about equal to the circumference of the original tube.

In this manner I eliminate a number of expensive separately formed parts and assembling operations and form a housing that is practically integral, requiring at most a slight surfacing of the flanges 4 for a tight fit of the brake aprons.

In this connection it should be noted that the tubing illustrated in Figs. 1 and 2 may be welded tubing formed from single strip and welded as indicated at 26 in Fig. 2. In such case the weld is preferably placed normal to the slots 12 and 14.

In such case, the strip is heated to a comparatively high temperature when it leaves the welding apparatus, thus effecting a saving of heat and time which otherwise would be lost.

Further, while I have described a method of forming the tube into an integral half of a housing, obviously this is not necessary, as both the flange end to receive the brake drum and the central portion to receive the gears may be made on separate pieces of stock material and the stock butt welded intermediate these portions.

While I have described my invention in reference to circular tubing, obviously it may be applied to tubing of any cross section, depending upon the shape desired in the finished housing.

I claim:

1. A method of forming axle housings for automotive vehicles from hollow tubing, which consists in upsetting one end of each of two sections of tubing and increasing the diameter of part of the upset portion sufficiently to bring it to approximately the original thickness of the tube and bending the end of the upset portion normal to the tubing and forming a thickened flange of the bent over material whereby to reduce the length of the section, forming the other end of each of said sections of tubing into a semi-annular U-shaped channel to further reduce the length of the section, butt welding the ends of said semi-annular channels to form a complete axle housing, the gear housing portion of which is substantially circular.

2. A method of forming an axle housing, which consists of upsetting one end of each of two sections of tubing, increasing the diameter of this upset end, to cause the walls of said end to be substantially the same thickness as the original stock, bifurcating the enlarged end by diametrically opposite longitudinal slots, spreading the bifurcated sections apart to form arcuate arms of U-shaped cross section integral with the stock and upsetting the flanges of the arms and butt welding two similar sections together across the ends of the arms to form a finished housing.

3. A method of forming axle housings, which consists in upsetting one end of each of two lengths of tube to increase the thickness of stock, then increasing the diameter of the upset ends of each length of tube sufficiently to bring the wall thickness thereof to substantially its original thickness, bifurcating the last mentioned ends by longitudinally extending slots and spreading the bifurcated portions apart and forming them into arcuate forks of channel shaped cross section, securing the two lengths of the tube together by fastening the ends of the forks of one to the ends of the forks of the other.

4. The method of forming axle housings for motor vehicles which consists of providing two lengths of tubes each having one end provided with diametrically opposite longitudinally extending slots, bending the bifurcated portions into arcuate forks of U-shaped channel cross section while maintaining the wall thickness of the forks so formed substantially equal to the thickness of the original stock, and securing together the lengths of tube so operated in axial alignment by fastening the ends of the U-shaped channel forks together.

5. The method of forming axle housings for motor vehicles, which consists of upsetting the ends of two lengths of tube, expanding said ends, bifurcating the ends of the upset portions by longitudinally diametrically opposite slots extending from the inner portions of the upset portions entirely to the adjacent outer end of the tube, spreading the bifurcated portions apart and forming them into outwardly extending arms, bending the arms into arcuate channels of substantially U-shaped cross section and securing the tubes together in axial alignment by securing the ends of the arcuate channels together.

6. The method of forming axle housings for motor vehicles, which consists of upsetting the ends of two lengths of tubes, expanding said ends, bifurcating the ends of the upset portions by longitudinally extending diametrically opposite slots extending from the inner ends of the upset portions entirely to the adjacent outer end of the tube, spreading the bifurcated portions apart and forming them into outwardly extending arms, bending the arms into arcuate channels of substantially U-shaped cross section, upsetting the flanges of the arcuate channels and securing the tubes together in axial alignment by welding the ends of the arcuate channels together.

7. The method of forming an article from tubing consisting of longitudinally slotting corresponding enlarged ends of two sections of tubing for a portion of the length of said enlarged ends to provide each section with a pair of longitudinally extending arms, spreading apart the arms of each section to provide each section with a forked end, and securing the forked ends together in longitudinal alignment.

8. The method of forming an axle housing from welded tubing consisting of upsetting and expanding the ends of two lengths of welded tubing without rupturing the weld, bifurcating the ends of the upset and expanded portions by longitudinally extending diametrically opposite slits extending from points adjacent the middle of the expanded portions to the adjacent outer end of the tube, spreading the bifurcated portions apart and forming them into outwardly bowed arms, and securing the welded tubes together in axial alignment by butt-welding the ends of the outwardly bowed arms together.

9. A method of forming axle housings which includes subjecting a length of tubing to axial compression to form a portion near the end into an outwardly bowed annulus having wall thickness substantially equal to that of the tube, bifurcating the end of the tubing by diametrically opposite longitudinal slots extending from the end of the tubing to the annulus, spreading apart the bifurcated portions and forming the same into outwardly extending arms of substantially channel-shaped cross section, and securing the member thus formed to a similar member by securing the end portions of the arms of said members together while holding the members in axial alignment.

10. A method of forming an article from tubular stock which includes the steps of forming a portion of a tube at one end into an enlarged end having a wall thickness substantially equal to that of the original stock, slotting the enlarged end with diametrically opposed longitudinal slots, spreading apart the slotted portion and forming such portion into arcuate arms and connecting said arms to corresponding arms of a similar member held in axial alignment therewith.

11. A method of forming an article from tubing consisting of bifurcating one end of each of two tubes to divide said end into a pair of arms, separating said arms and bending them into arcuate shape with substantially channel-shaped cross section, and securing the ends of the arms of the two tubes together in longitudinal alignment.

12. A method of forming a tubular member which includes the step providing an enlarged end on a tube, said enlarged end having a wall thickness substantially equal to that of the balance of the tube, slotting the annulus with diametrically opposite longitudinal slots extending from the free enlarged end of the tube, and spreading apart the bifurcated portions and forming such portions to substantially channel-shaped cross section.

ERNEST RIEMENSCHNEIDER.